March 16, 1926.

R. CONRADER

VALVE

Filed Dec. 12, 1924

1,577,177

Inventor

Rudolph Conrader

By H. Z. Lord
Attorney

Patented Mar. 16, 1926.

1,577,177

UNITED STATES PATENT OFFICE.

RUDOLPH CONRADER, OF ERIE, PENNSYLVANIA.

VALVE.

Application filed December 12, 1924. Serial No. 755,399.

*To all whom it may concern:*

Be it known that I, RUDOLPH CONRADER, a citizen of the United States, residing at Erie, in the county of Erie and State of Pennsylvania, have invented new and useful Improvements in Valves, of which the following is a specification.

This invention is designed to improve disc valves as to their simplicity of manufacture, their efficiency in use, the convenience with which such valves may be reground, to improve the relation of the disc and seat to adapt them for re-grinding and to improve the arrangement of the seat to facilitate the drainage through the valve. While the broad features of the invention are applicable to different types of valves, the invention is particularly advantageous with relation to valves having their seats at an angle to the passage. Other features and details of the invention will appear from the specification and claims.

The invention is illustrated in the accompanying drawings as follows:—

Figure 1:
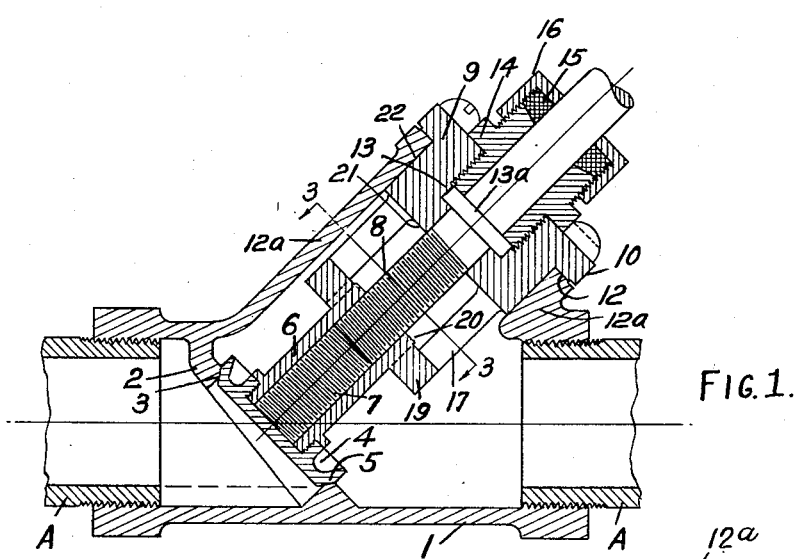

Fig. 1 shows a central section through the valve.

Figure 2:
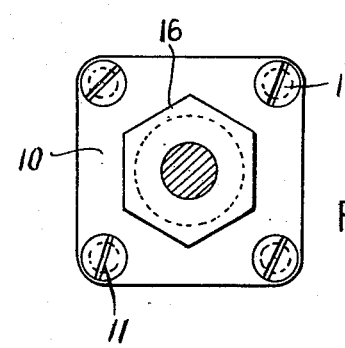

Fig. 2 a plan view of the bonnet.

Figure 3:
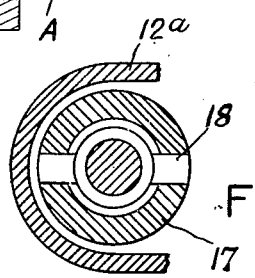

Fig. 3 a section on the line 3—3 in Fig. 1.

1 marks the body of the valve having the inclined seat, 2 the diaphragm in the body, 3 the bevelled seat in the diaphragm, 4 the valve disc, and 5 the seating surface on the disc conforming to the seat 3.

The disc has the screw-threaded extension 6, the extension being preferably provided with screw threads 7. A screwthreaded stem 8 forms a screw connection with the threads 7. The stem extends through a bonnet 9. The bonnet has the flange 10 which extends over and is seated on the end 12 of the bonnet projection 12ª. Screws 11 extend through the flange into the bonnet projection and secure the bonnet in place. A socket 13 is arranged in the bonnet and a collar or annular shoulder 13ª on the stem seats in the bottom of the socket. The shoulder is locked against axial movement in the socket by a plug 14 which is screwed into the socket. A stuffing box 15 is arranged on the outer end of the plug, the flanged nut 16 enclosing the stuffing box.

Guide projections 17 extend inwardly from the bonnet to a point along the extension 6. These guide projections have the slots 18 between them, the slots extending entirely through the projections so that the slots may be readily cast or machined as desired. Lugs 19 extend radially from the extension 6 into the slots and lock the extension against turning. The valve is operated by turning the stem, the extension being locked against turning and the stem being locked against axial movement. The result of the turning movement through the screw is to raise or lower the disc.

The placing of the guide projections on the bonnet is of particular advantage in a valve having the inclined seat in that the formation of such projections in the body as has commonly been done is difficult of manufacture. Further it is desirable to make the bonnet projection on the body as short as possible and this makes the projection at its short side too short for the guides. By putting the guide projection on the bonnet and permitting it to extend through the short side of the extension into the body the guides may be brought into proper relation with the valve extensions 6 and without undue length of the bonnet projection.

The extension has a seat 20 on its outer end which is adapted to close on a seat 21 on the lower surface of the bonnet when the extension is fully retracted.

The bonnet has the cylindrical guide surface 22 which extends into a cylindrical projection 12ª. This with the form of bonnet forms a very convenient structure by means of which the valve disc and seat may be reground, the guiding surface guiding the disc and the screw holding the bonnet flange out of seating position so that pressure may be exerted on the disc. At the same time the guide projections, acting through the extension, assist in turning the disc for the grinding operation.

In order that the grinding operation may be facilitated it is desirable that the outer edge of the seating surface of the disc shall terminate with the outer edge of the seat, in other words, shall not overhang the seat. Where such seating surface does overhang the seat a shoulder is formed on the seating surface as the valve is reground and this adds very materially to the difficulty in regrinding the valve and also detracts from the result. For the same reason the seating surface at the inner edge of the disc should extend to or beyond the inner edge of the seat.

It is very essential particularly for some uses that the seat opening be as low as the pipe A extending into the body so that such pipe may be drained through the valve. In the present invention the lower edge of the seat corresponds to a height approximating the lower edge of an inserted pipe which the valve is adapted to receive. This is preferably accomplished by enlarging the opening through the seat so as to lower the lower edge of the seat. In this way the valve body can be retained in reasonable lengths and at the same time a proper bonnet projection provided.

What I claim as new is:—

1. In a valve, the combination of a body having an inclined seat and an inclined bonnet projection; a valve disc operating on the seat; a screw extension on the disc; a screw-threaded stem having a screw connection with the extension; a bonnet on the bonnet projection in which the stem is rotatively mounted and locked against axial movement; and guiding means carried by the bonnet extending through the short side of the bonnet projection into the body and locking the extension against turning.

2. In a valve, the combination of a body having an inclined seat and an inclined bonnet projection, the seat having a valve opening therethrough, the bottom of the opening being adjacent to the bottom of the body and approximately at or below a line of an inserted standard pipe which the body is adapted to receive; a valve disc operating on the seat; a screw extension on the disc; a screw-threaded stem having a screw connection with the extension; a bonnet on the bonnet projection in which the stem is rotatively mounted and locked against axial movement; and guiding means carried by the bonnet extending through the short side of the bonnet projection into the body and locking the extension against turning.

In testimony whereof I have hereunto set my hand.

RUDOLPH CONRADER.